June 29, 1926.
P. F. WILLIS
ACETYLENE GAS GENERATOR
Filed Oct. 23, 1922
1,590,219
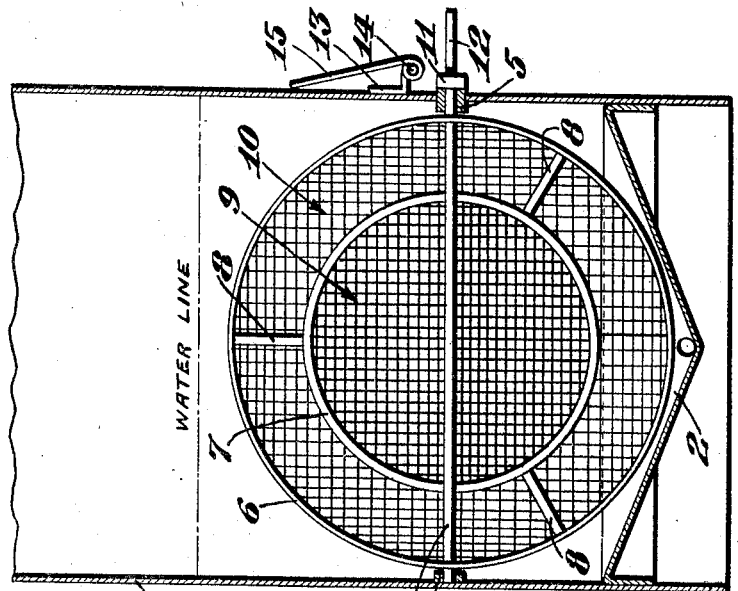
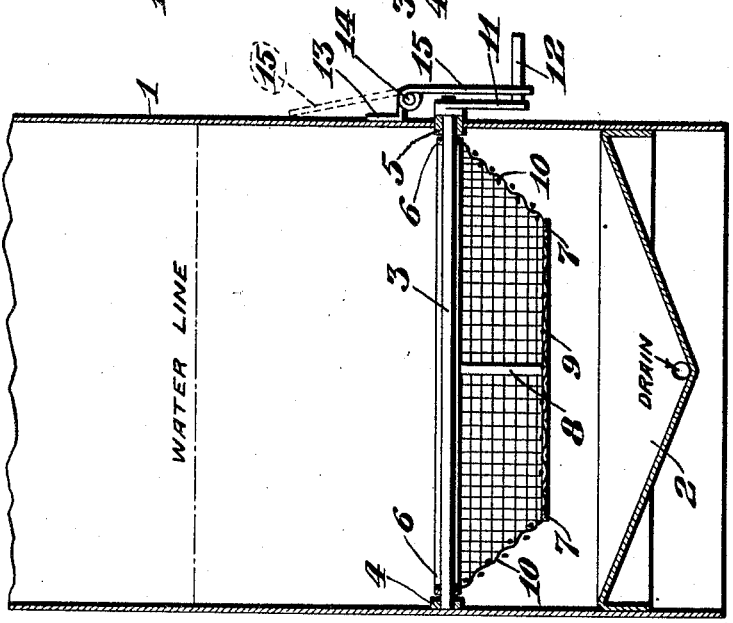
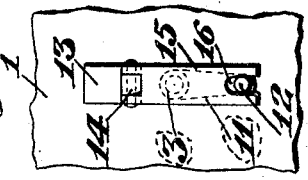
INVENTOR:
Prior F. Willis,
BY George A. Pennington
his ATTORNEY.

Patented June 29, 1926.

1,590,219

UNITED STATES PATENT OFFICE.

PRIOR F. WILLIS, OF ST. LOUIS, MISSOURI.

ACETYLENE-GAS GENERATOR.

Application filed October 23, 1922. Serial No. 596,252.

This invention relates to acetylene-gas generators, and more particularly to those of the carbide-feed type, or, in other words, that kind where the carbide is placed in a hopper and dropped therefrom into a large volume of water within the tank.

The water attacks the carbide, thereby creating acetylene and a residue of slacked lime which accumulates at the bottom of the generator.

Now lime is not only a poor conductor of heat, but accumulated in sufficient quantity will pack and become impervious or substantially so to water. This has certain serious objections. In the first place, the first carbide that drops into the water probably entirely disintegrates, leaving on the bottom of the generator a certain amount of slacked lime. Then, as more carbide is fed, this slacked lime becomes of a thicker consistency and covers the generator bottom to a depth of several inches. Now, subsequent falling carbide drops into this bed of soft lime. The bed of lime holds back the water and prevents complete generation of the gas, besides causing, in some instances, over-heating and consequent formation of the objectionable higher polymers of acetylene.

That all the gas is not obtained from the carbide in the present types of generators of which I am aware can easily be shown.

When the carbide hopper has emptied itself and needs refilling, the lime water is run off to be replaced with fresh water. Usually, an agitator is placed in the generator to stir up the water and lime residue, and as this agitator is turned or otherwise actuated, as the case may be, quite an amount of gas is given off, due to the water and particles of unslacked carbide being brought into contact.

Again, occasional explosions of acetylene gas generators have occurred. In most cases, these explosions have occurred while charging or just after charging the generator. This is due to the fact that during the act of putting fresh water and carbide into the generator, a certain amount of air (oxygen) passes in also, and the air mixing with whatever gas is in the machine forms an explosive mixture needing only a flame or live coal to ignite it. Should the attendant or operator in charge of the generator forget to replace the old sludge with water and the hopper start feeding the carbide, an explosion may very easily occur for the reason that there is enough moisture in the old sludge to cause slacking and heating but not enough moisture to keep the temperature down, with the result that the carbide gets red hot and then explodes the mixed acetylene and air.

The present invention, therefore, has for its objects to insure the complete disintegration of the carbide and the giving off of all its gas under normal working conditions, and to prevent explosions as above set forth in case the attendant or operator fails to put water in the generator. Other advantages to be attained will more fully appear in the following description.

The invention consists essentially in the provision of a basket or screen completely submerged in the water in the generator and with considerable water space both above and below it, the basket or screen being of such mesh to catch the carbide as it descends through the water from the hopper and yet permit the particles of lime to pass through to the bottom of generator; and, further, in the utilization of the basket or screen as an agitator for stirring up the water and lime for its easy removal through the drain pipe. The invention further consists in the parts and in the combinations and arrangements of parts hereinafter described and afterwards set forth with particularity in the appended claims.

In the accompanying drawings forming part of this specification and illustrating a practical embodiment of the invention,—

Figure 1 is a fragmentary vertical section through the lower portion of a generator tank, showing the basket or screen in normal working position;

Figure 2 is a similar view showing the basket or screen as given a quarter turn when used as an agitator; and Figure 3 is a fragmentary view in side elevation, showing the details of the latch for the operating crank of the basket or screen.

Referring now to the drawings, the numeral 1 designates the tank of the usual kind for an acetylene generator of the carbide-feed type. As the present invention is concerned only below the water line, that portion of the tank is illustrated, and the hopper, which may be of any suitable or approved construction and arrangement, is omitted, the same being well-known in the art.

The bottom of the tank, as shown, is dished or conoidal as at 2, but may be of any suitable shape or character according to the practice in heading a pressure tank.

Some distance above the bottom of the tank is a shaft 3 which is journaled at one end in a suitable bearing 4, the opposite end portion extending out through a bearing 5 diametrically opposite the bearing 4. The bearing 5, of course, in practice, is to be gas-tight about the shaft or provided with a suitable packing gland (not shown, but perfectly obvious) so as to prevent escape of gas from the tank and yet permit the shaft to be rotated at will.

Fastened on the shaft 3 is a ring 6 which is of a diameter nearly that of the interior of the tank, and below this ring is another 7 smaller in diameter, the two rings being connected by bars or rods 8, preferably three or more. On the frame thus formed is placed wire screen cloth to constitute a basket which is frustro-conical in shape, or, in other words, a basket-like screen having a flat bottom 9 and upwardly flaring side-wall 10.

The mesh of the screen cloth comprising the basket is of a size smaller than the pieces of carbide to be used, so as to arrest the carbide in its descent through the body of water, but being of sufficiently large opening to allow the particles of slacked lime to pass through to the bottom of the tank.

On the outer end of the shaft 3 is a crank-arm 11 having a suitable handle 12 by which the shaft may be conveniently rotated. In the normal working position of the basket or screen, as shown in Figure 1, the crank-arm 11 hangs straight downward, and to hold it in this position a suitable latch device is mounted on the outside of the tank so as to engage the arm direct or its handle portion 12, as may be desired. A simple form of this latch is more clearly shown in Figure 3 as comprising a bracket welded or otherwise suitably secured to the tank, as at 13, and having hinged thereto, as at 14, a leaf or plate 15 whose end portion is bifurcated or slotted, as at 16, so as to straddle the handle 12. In this way, the shaft 3 is held from rotation, yet the handle may be readily released by swinging the latch member 15 up and out of the way as shown by dotted lines in Figure 1 and full lines in Figure 2.

The locking device for preventing rotation of the shaft and consequent tilting of the basket while the generator is in operation is claimed broadly as a part of this invention and admits of considerable modification from the conventional latch arrangement just above described.

When the generator has emptied itself of its carbide the attendant or operator has only to lift the latch member 15 and manipulate the crank to rotate the basket. The basket then serves as an agitator to stir up the sludge so that the latter with the lime-water is easily removed from the generator. At the same time this stirring action tends to clean the screen from sediment that may have settled thereon. The position of the basket is such that when given a quarter turn (see Figure 2), it just clears the bottom of the generator, yet when in its normal horizontal position, as shown in Figure 1, there is considerable water space both above and below it so that the carbide falling on the bottom of the basket is attacked by the water from the bottom as well as at the top and sides.

As the carbide disintegrates the small particles fall through the screen. Every particle of the carbide is thus attacked by the water and thereby made to give off all of its gas.

A further advantage of the basket in its location is that should the attendant or operator forget to re-fill the machine with water, no explosiion can occur, for the carbide instead of falling on wet sludge at the bottom of the generator, simply falls into the screened basket where there is no sludge and nothing harmful occurs, not even generation. There would be no sludge on the screen for two reasons, first, because any lime forming would tend to drop off through the open mesh by the force of gravity, and, second, if any lime should perchance stick, it would be washed off when the basket was used as an agitator.

The invention comprehends broadly a basket or screen that normally is completely submerged in the body of water in the generator and into which the carbide drops, the screen cloth allowing the lime particles to drop through to the bottom of the generator as disintegration takes place; and, also, for a basket or screen used as an agitator to facilitate the removal of the lime-water and sludge through the drain pipe. The invention, therefore, is not limited to the specific construction and arrangement shown in the accompanying drawings, but admits of considerable modification within its spirit as defined by the appended claims.

What is claimed is:

1. In an acetylene gas generator, a normally horizontal but rotatable, reticular or foraminated, basket-like screen, located above the bottom of the generator tank but below the normal water level, releasable means for normally holding said screen in horizontal position, and means for rotating said screen, the diameter of said screen approximating that of the interior diameter of the tank, and the marginal portion of the screen sweeping close to the bottom of the tank during rotation of the screen, the apertures in said screen permitting the particles of slacked lime to pass through but retaining the particles of unattacked carbide.

2. In an acetylene gas generator, a normally horizontal but rotatable, reticular or foraminated, basket-like receptacle, located above the bottom of the generator tank but below the normal water level, said receptacle having a substantially flat bottom and an upwardly flaring, annular wall, the over-all diameter of said receptacle approximating that of the interior diameter of the tank, and the marginal portion of the receptacle sweeping close to the bottom of the tank during rotation of the receptacle, the apertures in said receptacle permitting the particles of slacked lime to pass through but retaining the particles of unattacked carbide.

3. In an acetylene gas generator, a normally horizontal but rotatable, reticular or foraminated, basket-like receptacle, located above the bottom of the generator tank but below the normal water level, said receptacle having a substantially flat bottom and an upwardly flaring, annular wall, the over-all diameter of said receptacle approximating that of the interior diameter of the tank, and the marginal portion of the receptacle sweeping close to the bottom of the tank during rotation of the receptacle, a shaft to which said receptacle is affixed diametrically across its marginal portion whereby to be suspended from said shaft and rotated thereby, means external of the generator tank for effecting rotation of the shaft, and means for releasably locking said shaft from rotation, the openings in said receptacle permitting the particles of slacked lime to pass through but retaining the particles of unattacked carbide.

PRIOR F. WILLIS.